United States Patent Office 3,743,669
Patented July 3, 1973

3,743,669
REACTION OF ACRYLIC TYPE COMPOUNDS WITH ALDEHYDES AND CERTAIN KETONES
Melville E. D. Hillman, Gillette, and Anthony B. Baylis, North Plainfield, N.J., assignors to Celanese Corporation, New York, N.Y.
No Drawing. Filed Nov. 6, 1970, Ser. No. 87,591
Int. Cl. C07c 69/76, 121/02
U.S. Cl. 260—465.6
12 Claims

ABSTRACT OF THE DISCLOSURE

Acrylates, acrylonitrile, acrylamides or vinyl ketones are readily reacted, even at ambient temperature, with an aldehyde in the presence of an organic tertiary amine catalyst to produce the corresponding 2-(1-hydroxyalkyl)-acrylates, acrylonitriles, acrylamides or vinyl ketones in very good yields. These product monomers having an —OH moiety in their structure exhibit, upon polymerization, good adhesive properties.

BACKGROUND OF THE INVENTION

It is known that an alkyl acrylate or acrylonitrile will react with an aldehyde in the presence of an organic phosphorus compound, e.g., tricyclohexyl phosphine, to produce the corresponding 2(1-hydroxyalkyl)-acrylate or acrylonitrile. (Cf. Morita et al., "Bulletin of the Chemical Society of Japan," vol. 41, No. (11), p. 2815, November 1968; British Pat. No. 1,168,000, Oct. 22, 1969). Unfortunately, the yields of these reactions are quite low, since the catalyst is readily exhausted (deactivated) during reaction. Furthermore, many side reactions are experienced, possibly due in part to the elevated temperatures needed for the reaction.

SUMMARY OF THE INVENTION

According to the present invention an ester, nitrile, amide or ketone derivative of an alpha-, beta-olefinically unsaturated carboxylic acid is reacted with an aldehyde in the presence of a catalyst which is a cyclic tertiary amine having at least one nitrogen atom common to three rings, e.g., triethylene diamine(diazabicyclo-[2,2,2]-octane), pyrrocoline, quinuclidine, and other like sterically unhindered tertiary amines which are relatively strong bases. The products which result are the corresponding 2(1-hydroxyalkyl)-acrylates, acrylonitriles, acrylamides or vinyl ketones.

A typical embodiment of the present invention involves mixing equimolar amounts of acrylonitrile and acetaldehyde with a minor amount of diazabicyclo-[2,2,2]-octane. The mixture is allowed to stand at room temperature (ca. 25° C.) until reaction is essentially complete. The product is extracted several times with suitable solutions and vacuum distilled. The percent conversion is very high and the product is identified as 2(1-hydroxyethyl)-acrylonitrile.

Typical alpha-, beta-olefinically unsaturated derivatives of carboxylic acids useful as reactants within the purview of the present invention are the acrylyl monomers of the general formula

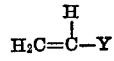

wherein Y includes

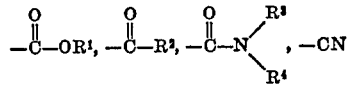

and the like, and $R^1$, $R^2$, $R^3$ and $R^4$ each represent branched or straight-chain, substituted or unsubstituted alkyl ($C_1$–$C_{12}$), substituted or unsubstituted cycloalkyl ($C_5$–$C_{12}$), cycloalkyl-substituted alkyl, substituted or unsubstituted aryl, aralkyl, alkaryl, and the like.

Among the many acrylyl monomers suitable for the present invention, the following are representative: acrylonitrile, methyl acrylate, ethyl acrylate, iso-octyl acrylate, 2-ethylhexyl acrylate, butyl acrylate, lauryl acrylate, phenyl acrylate, cyclohexylmethyl acrylate, cyclohexyl acrylate, cyclopentyl acrylate, phenylethyl acrylate, p-ethylphenyl acrylate, m-chlorophenyl acrylate, p-nitrophenyl acrylate, trichloromethyl acrylate, p-carboxymethylphenyl acrylate, p-methoxyphenyl acrylate, methyl vinyl ketone, isobutyl vinyl ketone, phenyl vinyl ketone, cyclohexyl vinyl ketone, p-chlorophenyl vinyl ketone, benzyl vinyl ketone, N,N-dimethyl acrylamide, N,N-dibutylacrylamide, N,N-dioctyl acrylamide, N,N-diphenyl acrylamide, N,N-dicyclohexyl acrylamide, and other like monomers.

Typical aldehydes contemplated herein may be represented by the formula RCHO, wherein R includes substituted or unsubstituted, branched or straight-chain alkyl ($C_1$–$C_3$); substituted or unsubstituted, branched or straight-chain lower alkenyl ($C_1$–$C_8$); substituted or unsubstituted alk-($C_1$–$C_4$) aryl; substituted or unsubstituted aralkyl ($C_1$–$C_4$); and substituted or unsubstituted aryl. The aryl moiety in the last three categories is generally phenyl.

Of the many aldehydes contemplated herein, the following are merely illustrative: acetaldehyde, n-butyraldehyde, phenylacetaldehyde, benzaldehyde, octanol, crotonaldehyde, m-ethylphenylacetaldehyde, m-chlorobenzaldehyde, p-nitrophenylacetaldehyde, m-carbomethoxybenzaldehyde, p-methoxybenzaldehyde.

The substituents contemplated for R and $R^1$ through $R^4$, above, must be inert under the reaction conditions and substantially non-reactive with the reaction components and catalyst. The above acrylyl monomers and aldehydes are merely illustrative.

The reactions of the present invention may be carried out within a wide range of temperatures. The reaction is effective at temperatures in the range of about 0° C. to about 200° C., preferably in the range of about 25° C. to about 125° C. When a solvent is used reaction is best carried out at a temperature at or below the boiling point of the solvent.

Although reaction takes place quite readily at atmospheric pressure, super-atmospheric or sub-atmospheric pressures may be employed. While batch processes have been used quite effectively, the present invention contemplates continuous and semi-continuous processes as well.

The reactants may be present in the reactant mixture in almost any concentration. Of course, there is always a lower and an upper limit for practicality. Generally a 1:1 mole ratio of acrylyl monomer:aldehyde, respectively, is suitable, but good results can be realized in the range of about 1:05 and about 0.02:1, preferably about 1:0.75 to about 0.2:1.

Insofar as the catalyst concentration is concerned, it is desirable that the catalyst be present in the range of about 0.1 to about 10 percent by weight, based upon the toal weight of reactants, i.e., acrylyl monomer and aldehyde; preferably the catalyst concentration is in the range of about 1 to about 5 percent by weight.

It has been found that the reaction may be carried out in the presence or absence of an inert solvent. Typical solvents are: dioxane, tetrahydrofuran (THF), acetonitrile, methyl ethyl ketone (MEK), ethanol, chloroform, ethyl acetate, and the like. Preferably the medium should be a solvent in which both reactants and catalyst are soluble. It has also been found that an excess of aldehyde can be very useful as a solvent.

As suggested just above, also, the solvents suitable for the process of the present invention are non-reactive, i.e., inert, or substantially non-reactive with the reaction components under the reaction conditions. Again, this same inertness applies equally well to the various substituents alluded to hereinbefore in describing the various reactants, i.e., acrylyl monomers and aldehydes.

The present invention will best be understood from the examples which follow, which examples, while detailed, are intended to be illustrative only and not unduly limiting, as will be evident to the person skilled in the art:

EXAMPLE I

To a one gallon jug was added acetaldehyde (348 grams, 7.9 moles), ethyl acrylate (527 grams, 5.27 moles) and diazabicyclo-[2,2,2]-octane (29.4 grams, 0.26 mole). The jug was sealed and allowed to stand at room temperature. Gas chromatographic analyses showed the reaction was 55% complete in 3 days and 93% complete in one week. At this time, the product was extracted twice with 6 N HCl, then with dilute caustic, then with saturated sodium chloride solution. Vacuum distillation gave a precut of unreacted starting materials (49.7 grams) and 574.1 grams of colorless liquid (B.P. 63° C./2.5 millimeters) product having the configuration

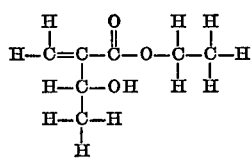

EXAMPLE II

An 800 milliliter autoclave was charged with acetaldehyde (132 grams, 3 moles), ethyl acrylate (200 grams, 2 moles) and diazabicyclo - [2,2,2] - octane (11.2 grams, 0.1 mole) then sealed and stirred. It was then heated at 120–124° C. for a total of eight hours. The reactor was cooled and the product was washed as in Example I, above, and vacuum distilled to give 170 grams of the desired product (same as Example I, above). The conversion was 82% with a 72% selectivity.

EXAMPLE III

To a one quart bottle was added acetaldehyde (338 milliliters, 6 moles) acrylonitrile (396 milliliters, 6 moles) and diazabicyclo - [2,2,2] - octane (33.3 grams, 0.3 mole). After 6 days standing at room temperature the reaction mixture was washed as in the above examples and vacuum distilled to give 2-cyano-3-hydroxyl-1-butene as a colorless oil, B.P. 59° C./2 millimeters (363 grams, 83.6% selectivity). The product configuration follows:

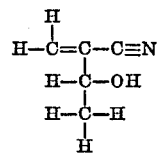

2 - cyano - 3-hydroxyl-1-butene or 2(1-hydroxyethyl) acrylonitrile.

EXAMPLES IV THROUGH XIX

The following examples were carried essentially as in Example I, above, except as specified in Table I, below. When temperatures above about 28° C. were used, an autoclave (as in Example II) was substituted for the reactor of Example I. Table I follows:

TABLE I

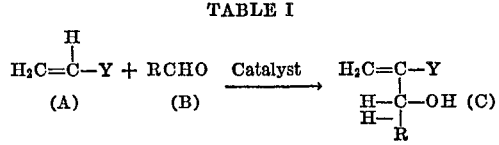

| Example | (A) | (B) | Solvent | Catalyst[1] | A:B (mole ratio) | Catalyst (percent by wt.) | Temp.; ° C. | (C) |
|---|---|---|---|---|---|---|---|---|
| IV | N,N-diethyl acrylamide | Isobutyraldehyde | Dioxane | D | 2:1 | 1.0 | 25 | 2(1-hydroxy-isobutyl)N,N diethyl acrylamide |
| V | Methyl vinyl ketone | Acetaldehyde | None | D | 1:12 | 2.2 | 10 | 2(1-hydroxyethyl) 1-butene-3-one |
| VI | Methyl acrylate | do | do | D | 1:1.5 | 8.1 | 50 | 2(1-hydroxyethyl)methyl acrylate |
| VII | Acrylonitrile | n-Butyraldehyde | do | D | 1:1 | 2.0 | 75 | 2(1-hydroxybutyl)acrylonitrile |
| VIII | Ethyl acrylate | Crotonaldehyde | THF | D | 1:1 | 2.8 | 27 | 2(1-hydroxy-2-butenyl)ethyl acrylate |
| IX | do | Phenylacetaldehyde | Dioxane | P | 1:1 | 5.0 | 23 | 2(1-hydroxy-2-phenylethyl) ethyl acrylate |
| X | do | Benzaldehyde | None | Q | 1:1 | 2.0 | 155 | 2(1 hydroxy-phenylmethyl)ethyl acrylate |
| XI | Phenyl acrylate | m-Chlorobenzaldehyde | Dioxane | D | 1:0.6 | 9.5 | 25 | 2(hydroxy-m-chlorophenylmethyl) phenyl acrylate |
| XII | Cyclohexyl acrylate | p-Methoxybenzaldehyde | Ethanol | D | 0.1:1.0 | 7.5 | 24 | 2(hydroxy-p-methoxyphenylmethyl) cyclohexylacrylate |
| XIII | m-Chlorophenyl acrylate | Octanal | None | P | 0.5:1 | 2.0 | 95 | 2(1-hydroxyoctyl)-m-chlorophenyl acrylate |
| XIV | p-Methoxyphenyl acrylate | Benzaldehyde | Dioxane | D | 0.05:1 | 2.0 | 22 | 2(hydroxy-phenylmethyl)p-methoxyphenyl acrylate |
| XV | Cyclohexyl vinyl ketone | p-Nitrophenylacetaldehyde | MEK | D | 0.5:1 | 4 | 25 | 2(1-hydroxy-p-nitrophenylethyl) cyclohexyl vinyl ketone |
| XVI | Phenyl vinyl ketone | Acetaldehyde | THF | D | 1:1 | 0.3 | 30 | 2(1-hydroxyethyl) phenyl vinyl ketone |
| XVII | Benzyl vinyl ketone | do | None | Q | 1:1.2 | 7.5 | 24 | 2(1-hydroxyethyl) benzyl vinyl ketone |
| XVIII | Nitroethylene | do | None | D | 0.3:1 | 2.1 | 25 | 2(1-hydroxyethyl) nitroethylene |
| XIX | N,N-diphenyl acrylamide | Butyraldehyde | dioxane | D | 0.75:1 | 3.0 | 92 | 2(1-hydroxybutyl)N,N-diphenyl acrylamide |

[1] Catalyst: D=diazabicyclo-[2,2,2]-octane; P=pyrrocoline; Q=quinuclidine.

While the present invention has been described in detail as to specific embodiments thereof, it is not intended that these details should exert undue restrictions upon the scope of the invention. The person skilled in the are will readily recognize the variations and modifications within the purview and spirit of the instant discovery.

What is claimed is:

1. In the method of preparing acrylic compounds of the formula

by reacting, in liquid phase at a temperature between about 0° C. and about 200° C., an alpha-, beta-olefinically unsaturated carboxylic acid derivative of the formula

with an aldehyde of the formula

RCHO        (B)

in the presence of a catalyst, wherein Y in Formulae A and C represents a member selected from the group consisting of

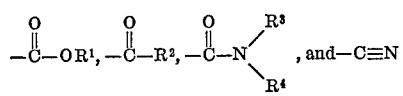

where $R^1$ through $R^4$ each represents alkyl ($C_1$–$C_{12}$), cycloalkyl ($C_5$–$C_{12}$), aryl, aralkyl or alkaryl, and R in Formula B represents alkyl ($C_1$–$C_8$), alk-($C_1$–$C_4$) aryl, aralkyl ($C_1$–$C_4$) or aryl, the improvement which comprises effecting said reaction in the presence of a catalytic amount of an organic cylic, sterically unhindered tertiary amine selected from the group consisting of diazabicyclo [2.2.2]-octane, pyrrocoline and quinuclidine.

2. The method of claim 1 wherein the reaction is carried out at ambient temperature.

3. The method of claim 1 wherein the reaction is carried out at a temperature in the range of about 25° C. to about 125° C.

4. The method of claim 1 wherein the reaction is carried out in the presence of an inert solvent.

5. The method of claim 1 wherein the catalyst is diazabicyclo-[2.2.2]-octane.

6. The method of claim 1 wherein the catalyst is pyrrocoline.

7. The method of claim 1 wherein the catalyst is quinculidine.

8. The process of claim 1 wherein the mole ratio of reactant (A) to reactant (B) is between about 1:05 and about 0.02:1 and the catalyst is present in the concentration of about 0.1 to about 10 percent by weight, based upon the total weight of reactants (A) and (B).

9. The process of claim 1 wherein the mole ratio of reactant (A) to reactant (B) is between about 1:0.75 and about 0.2:1 and the catalyst is present in the concentration of about 1 to about 5 percent by weight, based upon the total weight of reactants (A) and (B).

10. The process of claim 1 wherein reactant (B), present in substantial excess, acts as a solvent medium.

11. The method according to claim 2 wherein reactant (A) is ethyl acrylate, reactant (B) is acetaldehyde, compound (C) is 2- 1-hydroxyethyl)-ethyl acrylate and the tertiary amine catalyst is diazabicyclo-[2,2,2]-octane.

12. The method according to claim 2 wherein reactant (A) is acrylonitrile, reactant (B) is acetaldehyde, compound (C) is 2-(1-hydroxyethyl)-acrylonitrile and the tertiary amine catalyst is diazabicyclo-[2,2,2]-octane.

References Cited
UNITED STATES PATENTS

| | | | |
|---|---|---|---|
| 3,499,024 | 3/1970 | Morita et al. | 260—465 F |
| 3,446,836 | 5/1969 | Lambert et al. | 260—465.8 D |
| 3,567,760 | 3/1971 | Feldman et al. | 260—465.8 D |
| 3,499,922 | 3/1970 | Feldman et al. | 260—465.8 D |
| 3,538,141 | 11/1970 | Kollar | 260—465.8 D |
| 3,562,311 | 2/1971 | McClure | 260—465.8 D |
| 3,590,069 | 6/1971 | Nemec et al. | 260—465.8 D |

JOSEPH P. BRUST, Primary Examiner

U.S. Cl. X.R.

260—464, 465 F, 473 A, 484 R, 557 R, 559 R, 561 B, 562 R, 562 P, 586 R, 590, 594, 638